(12) United States Patent
Kodama et al.

(10) Patent No.: US 8,826,887 B2
(45) Date of Patent: Sep. 9, 2014

(54) SPARK IGNITION TYPE INTERNAL COMBUSTION ENGINE

(75) Inventors: Kohei Kodama, Mishima (JP); Daisuke Akihisa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 314 days.

(21) Appl. No.: 13/505,654

(22) PCT Filed: Dec. 28, 2009

(86) PCT No.: PCT/JP2009/071921
§ 371 (c)(1),
(2), (4) Date: May 2, 2012

(87) PCT Pub. No.: WO2011/080844
PCT Pub. Date: Jul. 7, 2011

(65) Prior Publication Data
US 2012/0222653 A1    Sep. 6, 2012

(51) Int. Cl.
*F02P 5/00* (2006.01)
*F02D 13/02* (2006.01)
*F02D 15/04* (2006.01)
*F02P 5/152* (2006.01)

(52) U.S. Cl.
CPC ............ *F02P 5/152* (2013.01); *F02D 13/0238* (2013.01); *Y02T 10/18* (2013.01); *F02D 15/04* (2013.01); *Y02T 10/46* (2013.01)
USPC ............ 123/406.35; 123/406.53; 123/406.55

(58) Field of Classification Search
USPC ............ 123/406.11, 406.23, 406.24, 406.26, 123/406.35, 406.53, 406.54, 406.55, 48 R, 123/48 B, 48 C, 90.15; 701/101, 102, 113
See application file for complete search history.

(56) References Cited

U.S. PATENT DOCUMENTS

| | | | |
|---|---|---|---|
| 4,419,974 A | 12/1983 | Nagase et al. | |
| 5,469,818 A * | 11/1995 | Yoshioka et al. | 123/90.15 |
| 2002/0139346 A1 * | 10/2002 | Aoyama et al. | 123/339.24 |
| 2003/0213451 A1 | 11/2003 | Aoyama et al. | |

(Continued)

FOREIGN PATENT DOCUMENTS

| | | |
|---|---|---|
| JP | 57 59060 | 4/1982 |
| JP | 2003 328794 | 11/2003 |

(Continued)

OTHER PUBLICATIONS

International Search Report Issued Feb. 2, 2010 in PCT/JP09/71921 Filed Dec. 28, 2009.

*Primary Examiner* — Mahmoud Gimie
(74) *Attorney, Agent, or Firm* — Oblon, Spivak, McClelland, Maier & Neustadt, L.L.P.

(57) ABSTRACT

An internal combustion engine provided with a variable compression ratio mechanism able to change a mechanical compression ratio and a variable valve timing mechanism able to control a closing timing of an intake valve. An actual compression ratio and ignition timing in a predetermined standard state after completion of engine warm-up are stored in advance as a reference actual compression ratio and a reference ignition timing. When the engine temperature is low or the intake air temperature is low, at the time of engine high speed operation, the actual compression ratio is made to increase over the reference actual compression ratio, while at the time of engine low speed operation, the ignition timing is made to advance over the reference ignition timing.

6 Claims, 15 Drawing Sheets

(56) References Cited

U.S. PATENT DOCUMENTS

| | | | |
|---|---|---|---|
| 2005/0087155 A1* | 4/2005 | Kikori | 123/78 C |
| 2008/0210196 A1 | 9/2008 | Ashizawa et al. | |
| 2009/0012700 A1 | 1/2009 | Akihisa et al. | |
| 2009/0064966 A1* | 3/2009 | Nakasaka | 123/339.11 |

FOREIGN PATENT DOCUMENTS

| | | |
|---|---|---|
| JP | 2007 85232 | 4/2007 |
| JP | 2007 303423 | 11/2007 |
| JP | 2008 121499 | 5/2008 |
| JP | 2009 264229 | 11/2009 |

* cited by examiner (A)   (B)

(A)

(B)

(C)

(A)

(B)

(A)

(B)

(A)

(B)

(A)

(B)

(C)

(A)

(B)

(A)

| | LOW SPEED | HIGH SPEED |
|---|---|---|
| ACTUAL COMPRESSION RATIO | DECREASE | INCREASE |
| IGNITION TIMING | ADVANCE | RETARD |

(B)

(C)

(A)

(B)

US 8,826,887 B2

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine which is provided with a variable compression ratio mechanism able to change a mechanical compression ratio and a variable valve timing mechanism able to control a closing timing of an intake valve and which increases the mechanical compression ratio and retards the closing timing of the intake valve as the engine load becomes lower (for example, see Patent Literature 1). In this internal combustion engine, the actual compression ratio is made as high as possible within the range where knocking does not occur and thereby the thermal efficiency is improved.

CITATIONS LIST

Patent Literature

Patent Literature 1: Japanese Patent Publication (A) No. 2007-303423

SUMMARY OF INVENTION

Technical Problem

However, in this internal combustion engine, no consideration is given at all to improving the thermal efficiency when the engine temperature is low such as at the time of engine startup or when the intake air temperature is low such as in the winter.

An object of the present invention is to provide a spark ignition type internal combustion engine which can improve the thermal efficiency when the engine temperature is low or when the intake air temperature is low.

Solution to Problem

According to the present invention, there is provided a spark ignition type internal combustion engine comprising a variable compression ratio mechanism able to change a mechanical compression ratio and a variable valve timing mechanism able to control a closing timing of an intake valve, wherein an actual compression ratio and ignition timing in a predetermined standard state after completion of engine warm-up are stored in advance as a reference actual compression ratio and a reference ignition timing in accordance with each operating state of the engine, when a temperature which represents an engine temperature is lower than a temperature in the standard state or when an intake air temperature is lower than an intake air temperature in the standard state, if at the time of engine high speed operation, the actual compression ratio is made to increase over the reference actual compression ratio so as to make a thermal efficiency rise, while if at the time of engine low speed operation, the ignition timing is made to advance over the reference ignition timing so as to make the thermal efficiency rise.

Advantageous Effects of Invention

When a temperature which represents the engine temperature is lower than a temperature in the standard state or when an intake air temperature is lower than an intake air temperature in the standard state, the thermal efficiency can be improved without causing knocking.

DESCRIPTION OF EMBODIMENTS

Figure 1:
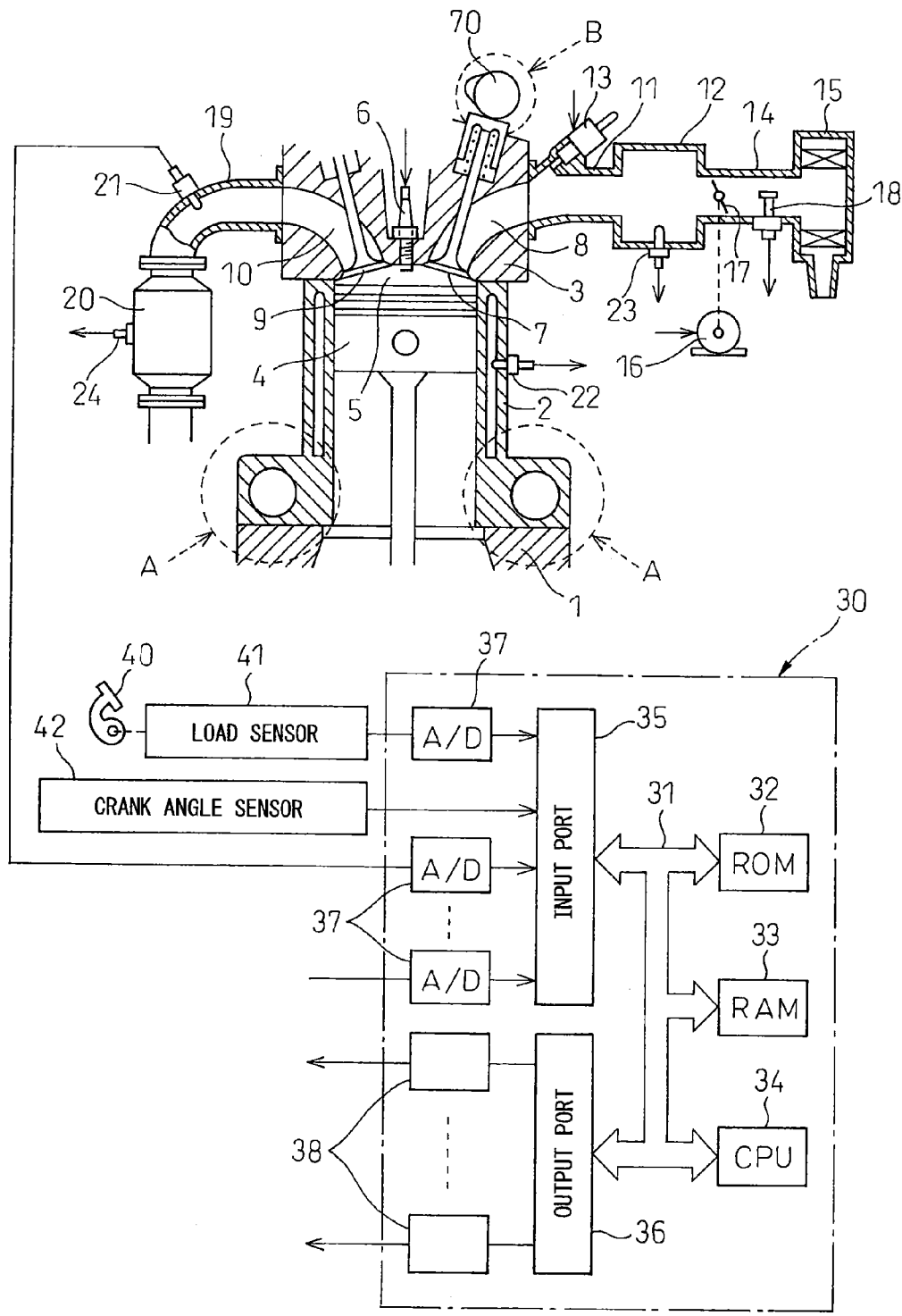
FIG. 1 is an overview of a spark ignition type internal combustion engine.

FIG. 1 shows a side cross-sectional view of a spark ignition type internal combustion engine.

Referring to FIG. 1, 1 indicates a crankcase, 2 a cylinder block, 3 a cylinder head, 4 a piston, 5 a combustion chamber, 6 a spark plug arranged at the top center of a combustion chamber 5, 7 an intake valve, 8 an intake port, 9 an exhaust valve, and 10 an exhaust port. Each intake port 8 is connected through an intake branch pipe 11 to a surge tank 12, while a fuel injector 13 for injecting fuel toward a corresponding intake port 8 is arranged by each intake branch pipe 11. Note that each fuel injector 13 may be arranged at each combustion chamber 5 instead of being attached to each intake branch pipe 11.

The surge tank 12 is connected through an intake duct 14 to an air cleaner 15, while the intake duct 14 is provided inside it with a throttle valve 17 which is driven by an actuator 16 and an intake air amount detector 18 which uses for example a hot wire. On the other hand, the exhaust port 10 is connected through an exhaust manifold 19 to a catalytic converter 20 which houses for example a three-way catalyst, and an air-fuel ratio sensor 21 is arranged in the exhaust manifold 19. Further, as shown in FIG. 1, the cylinder block 2 has a temperature sensor 22 attached to it for detecting an engine cooling water temperature, the surge tank 12 has a temperature sensor 23 attached to it for detecting an intake air temperature, and the catalytic converter 20 has a temperature sensor 24 attached to it for detecting a temperature of the three-way catalyst.

On the other hand, in the embodiment shown in FIG. 1, the connecting part of the crankcase 1 and the cylinder block 2 is provided with a variable compression ratio mechanism A which is able to change the relative positions of the crankcase 1 and cylinder block 2 in the cylinder axial direction so as to change the volume of the combustion chamber 5 when the piston 4 is positioned at compression top dead center. Further, an actual compression action start timing changing mechanism B which is able to change a start timing of an actual compression action is provided. Note that in the embodiment shown in FIG. 1, this actual compression action start timing changing mechanism B is comprised of a variable valve timing mechanism which is able to control the closing timing of the intake valve 7.

The electronic control unit 30 is comprised of a digital computer which is provided with a ROM (read only memory) 32, RAM (random access memory) 33, CPU (microprocessor) 34, input port 35, and output port 36, which are connected with each other through a bidirectional bus 31. The output signals of the intake air amount detector 18, the air-fuel ratio sensor 21, and the temperature sensors 22, 23, and 24 are input through corresponding AD converters 37 to the input port 35. Further, an accelerator pedal 40 is connected to a load sensor 41 which generates an output voltage proportional to the amount of depression L of the accelerator pedal 40. The output voltage of the load sensor 41 is input through a corresponding AD converter 37 to the input port 35. Further, the input port 35 is connected to a crank angle sensor 42 which generates an output pulse every time the crankshaft rotates by for example 30°. On the other hand, the output port 36 is connected through a drive circuit 38 to spark plugs 6, fuel injectors 13, throttle valve drive actuator 16, variable compression ratio mechanism A, and variable valve timing mechanism B.

Figure 2:
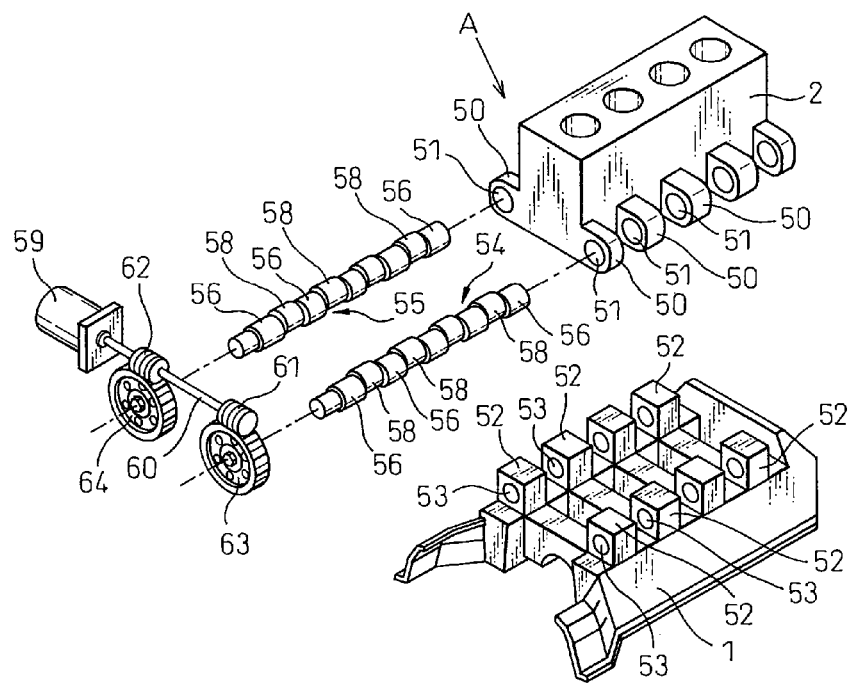
FIG. 2 is a disassembled perspective view of a variable compression ratio mechanism.
Figure 3:
FIG. 3 is a side cross-sectional view of the illustrated internal combustion engine.
Figure 3:
Figure 3:
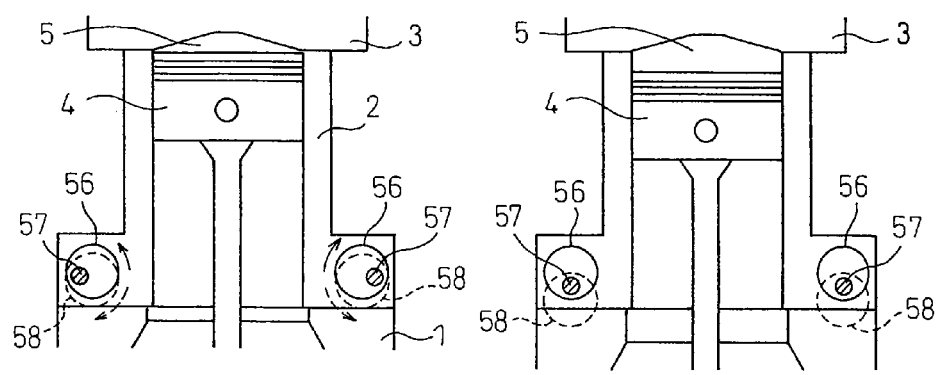

FIG. 2 is a disassembled perspective view of the variable compression ratio mechanism A which is shown in FIG. 1, while FIG. 3 is a side cross-sectional view of the illustrated internal combustion engine. Referring to FIG. 2, at the bottom of the two side walls of the cylinder block 2, a plurality of projecting parts 50 which are separated from each other by a certain distance are formed. Each projecting part 50 is formed with a circular cross-section cam insertion hole 51. On the other hand, the top surface of the crankcase 1 is formed with a plurality of projecting parts 52 which are separated from each other by a certain distance and which fit between the corresponding projecting parts 50. These projecting parts 52 are also formed with circular cross-section cam insertion holes 53.

As shown in FIG. 2, a pair of cam shafts 54 and 55 is provided. Each of the cam shafts 54 and 55 has circular cams 56 fixed on it able to be rotatably inserted in the cam insertion holes 51 at every other position. These circular cams 56 are coaxial with the axes of rotation of the cam shafts 54 and 55. On the other hand, between the circular cams 56, as shown by the hatching in FIG. 3, extend eccentric shafts 57 arranged eccentrically with respect to the axes of rotation of the cam shafts 54 and 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 which are fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crankcase 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crankcase 1. If the cylinder block 2 separates from the crankcase 1, the volume of a combustion chamber 5 when the piston 4 is positioned as compression top dead center increases, therefore by making the cam shafts 54 and 55 rotate, the volume of a combustion chamber 5 when the piston 4 is positioned as compression top dead center can be changed.

As shown in FIG. 2, to make the cam shafts 54 and 55 rotate in opposite directions, the shaft of a drive motor 59 is provided with a pair of worm gears 61 and 62 with opposite thread directions. Gears 63 and 64 engaging with these worm gears 61 and 62 are fastened to ends of the cam shafts 54 and 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
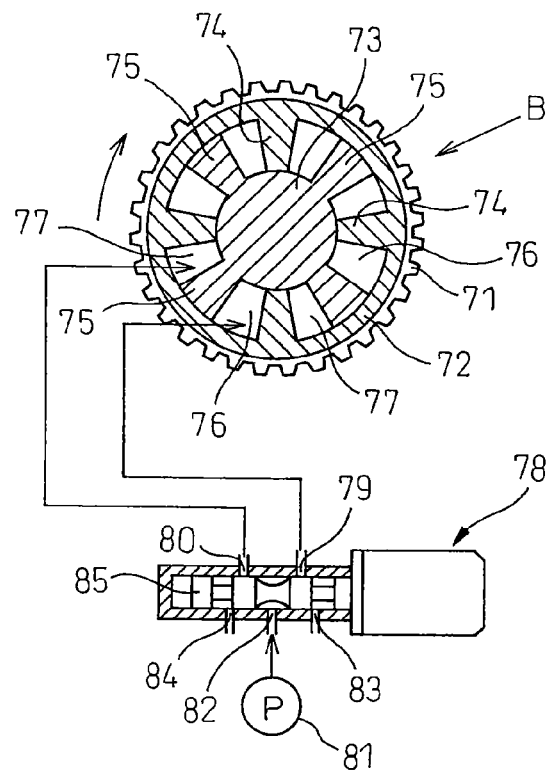
FIG. 4 is a view which shows a variable valve timing mechanism.

On the other hand, FIG. 4 shows a variable valve timing mechanism B which is attached to the end of a cam shaft 70 for driving the intake valve 7 in FIG. 1. Referring to FIG. 4, this variable valve timing mechanism B is provided with a timing pulley 71 which is rotated by an engine crankshaft through a timing belt in the arrow direction, a cylindrical housing 72 which rotates together with the timing pulley 71, a shaft 73 which is able to rotate together with an intake valve drive cam shaft 70 and to rotate relative to the cylindrical housing 72, a plurality of partitions 74 which extend from an inside circumference of the cylindrical housing 72 to an outside circumference of the shaft 73, and vanes 75 which extend between the partitions 74 from the outside circumference of the shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76 and 77 is controlled by a working oil feed control valve 78. This working oil feed control valve 78 is provided with hydraulic ports 79 and 80 which are connected to the hydraulic chambers 76 and 77, a feed port 82 for working oil which is discharged from a hydraulic pump 81, a pair of drain ports 83 and 84, and a spool valve 85 for controlling connection and disconnection of the ports 79, 80, 82, 83, and 84.

To advance the phase of the cams of the intake valve drive cam shaft 70, in FIG. 4, the spool valve 85 is made to move to the right, working oil which is fed from the feed port 82 is fed through the hydraulic port 79 to the advancing use hydraulic chambers 76, and working oil in the retarding use hydraulic chambers 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil fed from the feed port 82 is fed through the hydraulic port 80 to the retarding use hydraulic chambers 77, and working oil in the advancing use hydraulic chambers 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
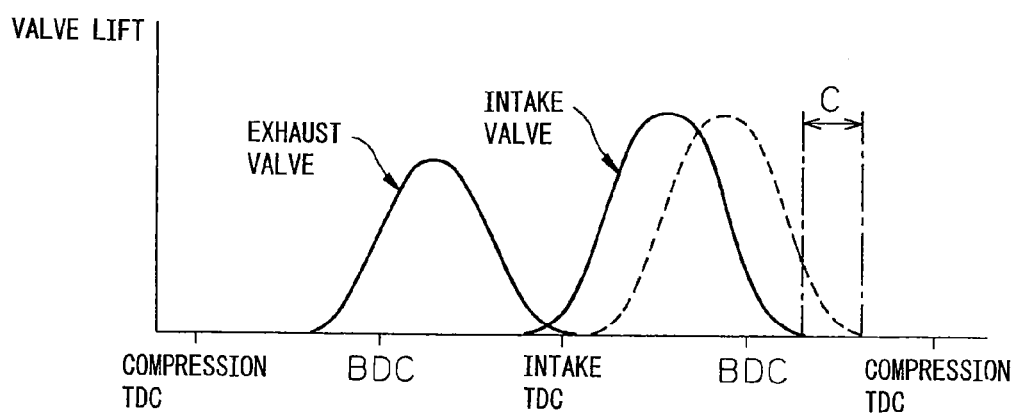
FIG. 5 is a view which shows the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range which is shown by the solid line in FIG. 5 and the range which is shown by the broken line, therefore the closing timing of the intake valve 7 can be set to any crank angle in the range which is shown by the arrow C in FIG. 5.

The variable valve timing mechanism B which is shown in FIG. 1 and FIG. 4 is one example. For example, a variable valve timing mechanism or other various types of variable valve timing mechanisms which are able to change only the closing timing of the intake valve while maintaining the opening timing of the intake valve constant can be used.

Figure 6:
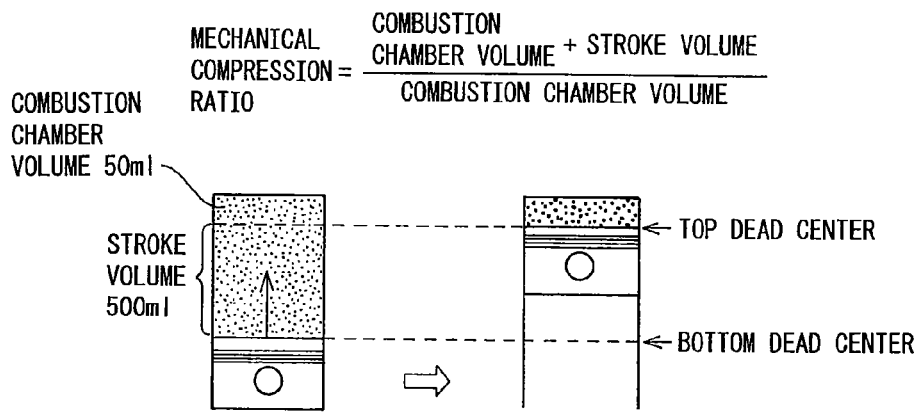
FIG. 6 is a view for explaining the mechanical compression ratio, actual combustion ratio, and expansion ratio.
Figure 6:
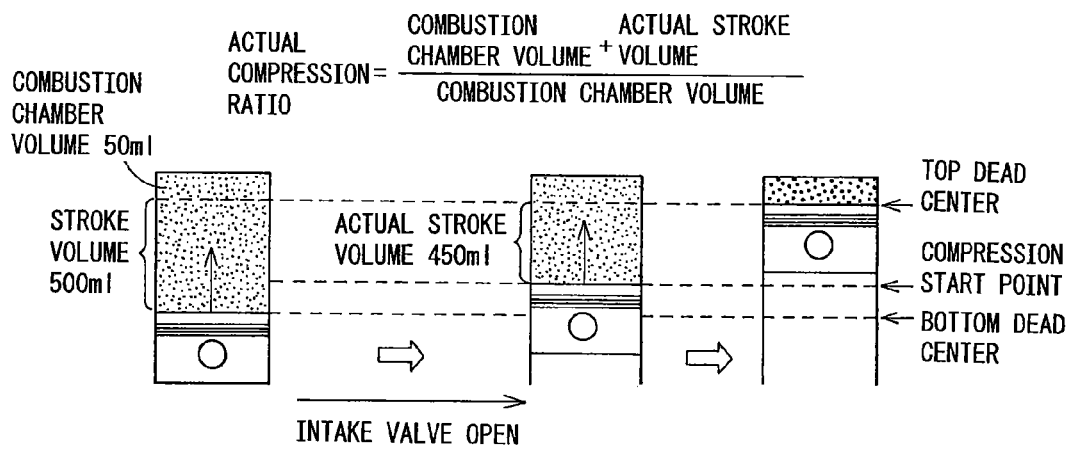
Figure 6:
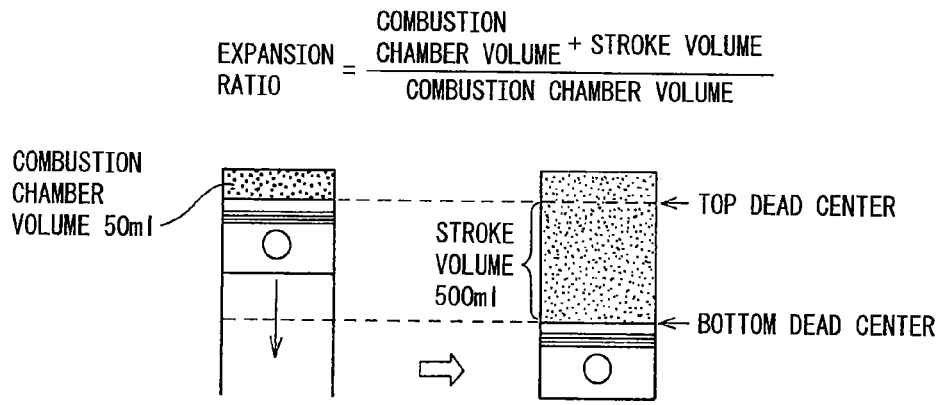

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual combustion ratio. This actual combustion ratio is a value determined from the actual stroke volume of the piston from when the compression action is actually started to when the piston reaches top dead center and the combustion chamber volume. This actual combustion ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual combustion ratio is expressed as follows using the actual stroke volume. In the example shown in FIG. 6(B), the actual combustion ratio becomes (50 ml+450 ml)/50 ml=10.

FIG. 6(C) explains the expansion ratio. The expansion ratio is a value determined from the stroke volume of the piston at the time of an expansion stroke and value determined from the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the superhigh expansion ratio cycle which is used in the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle which are used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIGS. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual combustion ratio is also about 11, and the expansion ratio also becomes (50 ml+500 ml)/50 ml=11. That is, in an ordinary internal combustion engine, the mechanical compression ratio and actual combustion ratio and the expansion ratio become substantially equal.

Figure 7:
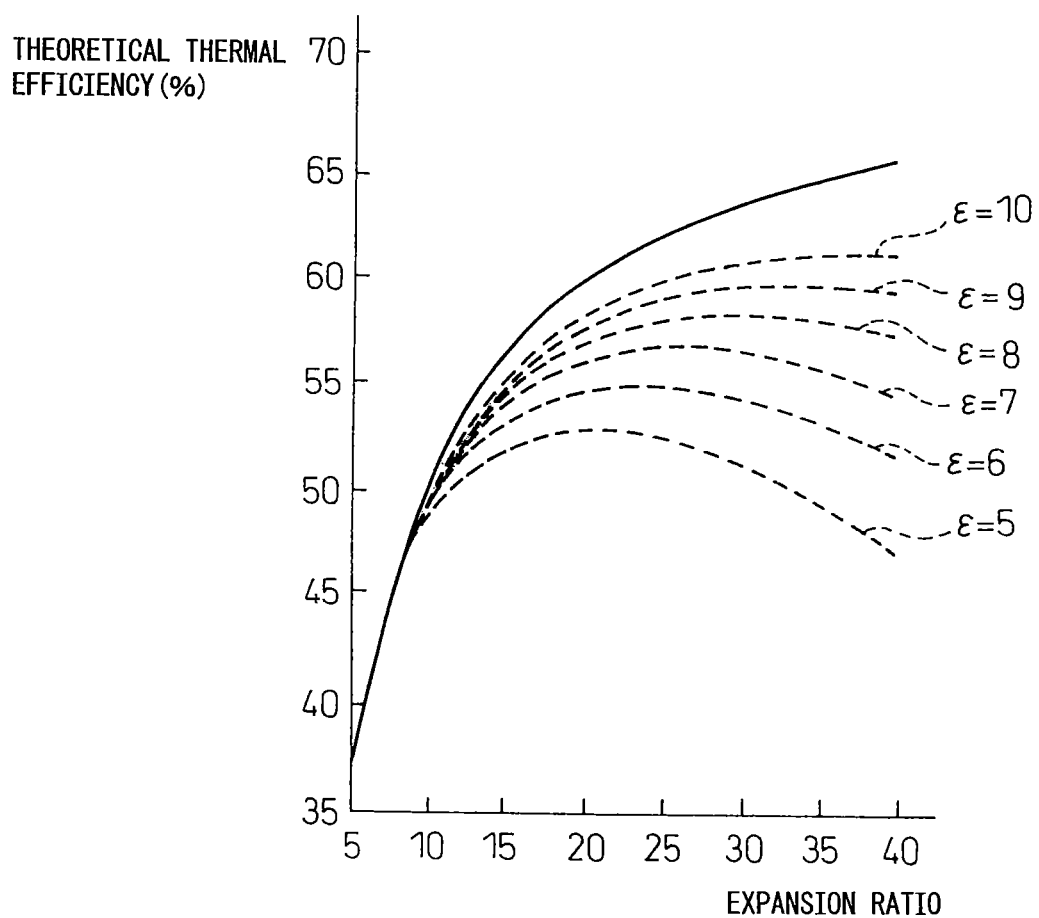
FIG. 7 is a view which shows the relationship between the theoretical thermal efficiency and expansion ratio.
Figure 8:
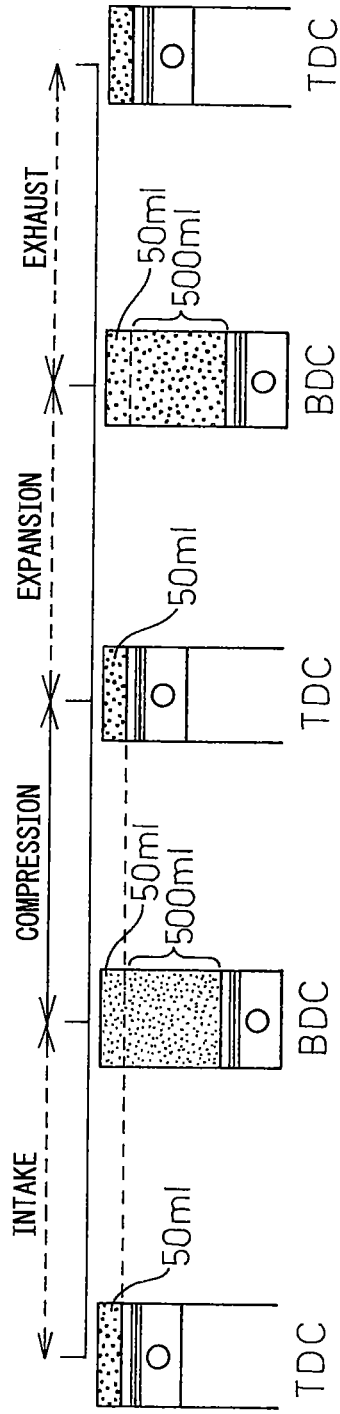
FIG. 8 is a view for explaining an ordinary cycle and superhigh expansion ratio cycle.
Figure 8:
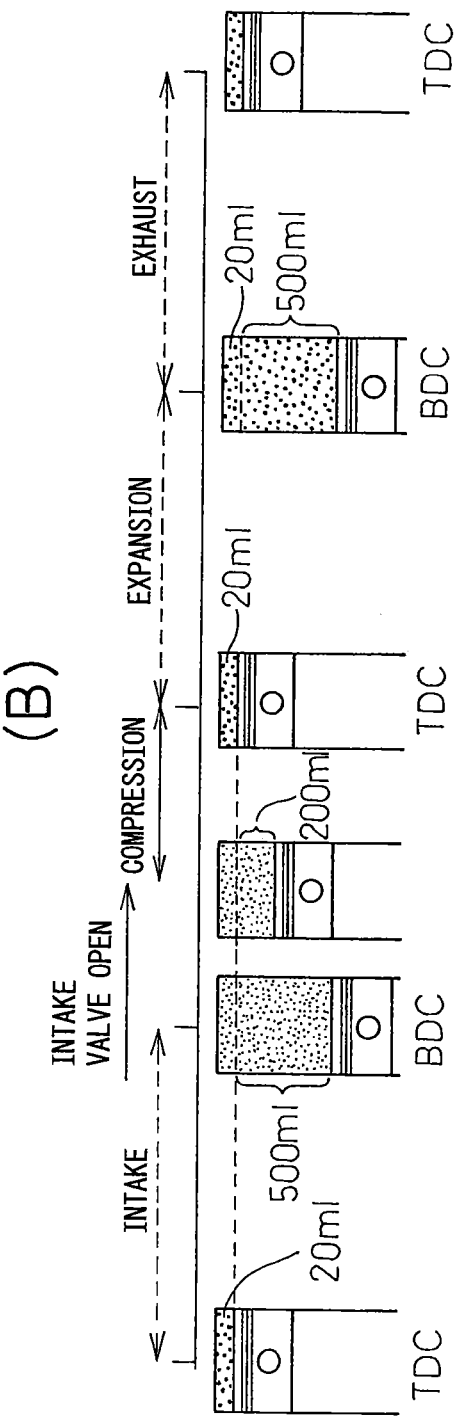

The solid line in FIG. 7 shows the change in the theoretical thermal efficiency in the case where the actual combustion ratio and expansion ratio are substantially equal, that is, in the ordinary cycle. In this case, it is learned that the larger the expansion ratio, that is, the higher the actual combustion ratio, the higher the theoretical thermal efficiency. Therefore, in an ordinary cycle, to raise the theoretical thermal efficiency, the actual combustion ratio should be made higher. However, due to the restrictions on the occurrence of knocking at the time of engine high load operation, the actual combustion ratio can only be raised even at the maximum to about 12, accordingly, in an ordinary cycle, the theoretical thermal efficiency cannot be made sufficiently high.

On the other hand, under this situation, to raise the theoretical thermal efficiency while strictly differentiating between the mechanical compression ratio and actual combustion ratio were studied and as a result, it is discovered that in the theoretical thermal efficiency, the expansion ratio is dominant, and the theoretical thermal efficiency is not affected much at all by the actual combustion ratio. That is, if raising the actual combustion ratio, the explosive force rises, but compression requires a large energy, accordingly even if raising the actual combustion ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line $\epsilon=10$ in FIG. 7 shows the theoretical thermal efficiency in the case of fixing the actual combustion ratio at 10 and raising the expansion ratio in that state. In this way, it is learned that the amount of rise of the theoretical thermal efficiency when raising the expansion ratio in the state where the actual combustion ratio is maintained at a low value and the amount of rise of the theoretical thermal efficiency in the case where the actual combustion ratio is increased along with the expansion ratio as shown by the solid line of FIG. 7 will not differ that much.

If the actual combustion ratio is maintained at a low value in this way, knocking will not occur, therefore if raising the expansion ratio in the state where the actual combustion ratio is maintained at a low value, the occurrence of knocking can be prevented and the theoretical thermal efficiency can be greatly raised. FIG. 8(B) shows an example of the case when using the variable compression ratio mechanism A and the variable valve timing mechanism B to maintain the actual combustion ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual combustion ratio becomes (20 ml+200 ml)/20 ml=11 and the expansion ratio becomes (20 ml+500 ml)/20 ml=26. In the ordinary cycle shown in FIG. 8(A), as explained above, the actual combustion ratio is about 11 and the expansion ratio is 11. Compared with this case, in the case shown in FIG. 8(B), it is learned that only the expansion ratio is raised to 26. This is the reason that it is called the superhigh expansion ratio cycle.

Generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in this embodiment of the present invention, when the engine low load is relatively low, the superhigh expansion ratio cycle which is shown in FIG. 8(B) is used, while at the time of engine high load operation, the ordinary cycle which is shown in FIG. 8(A) is used.

Figure 9:
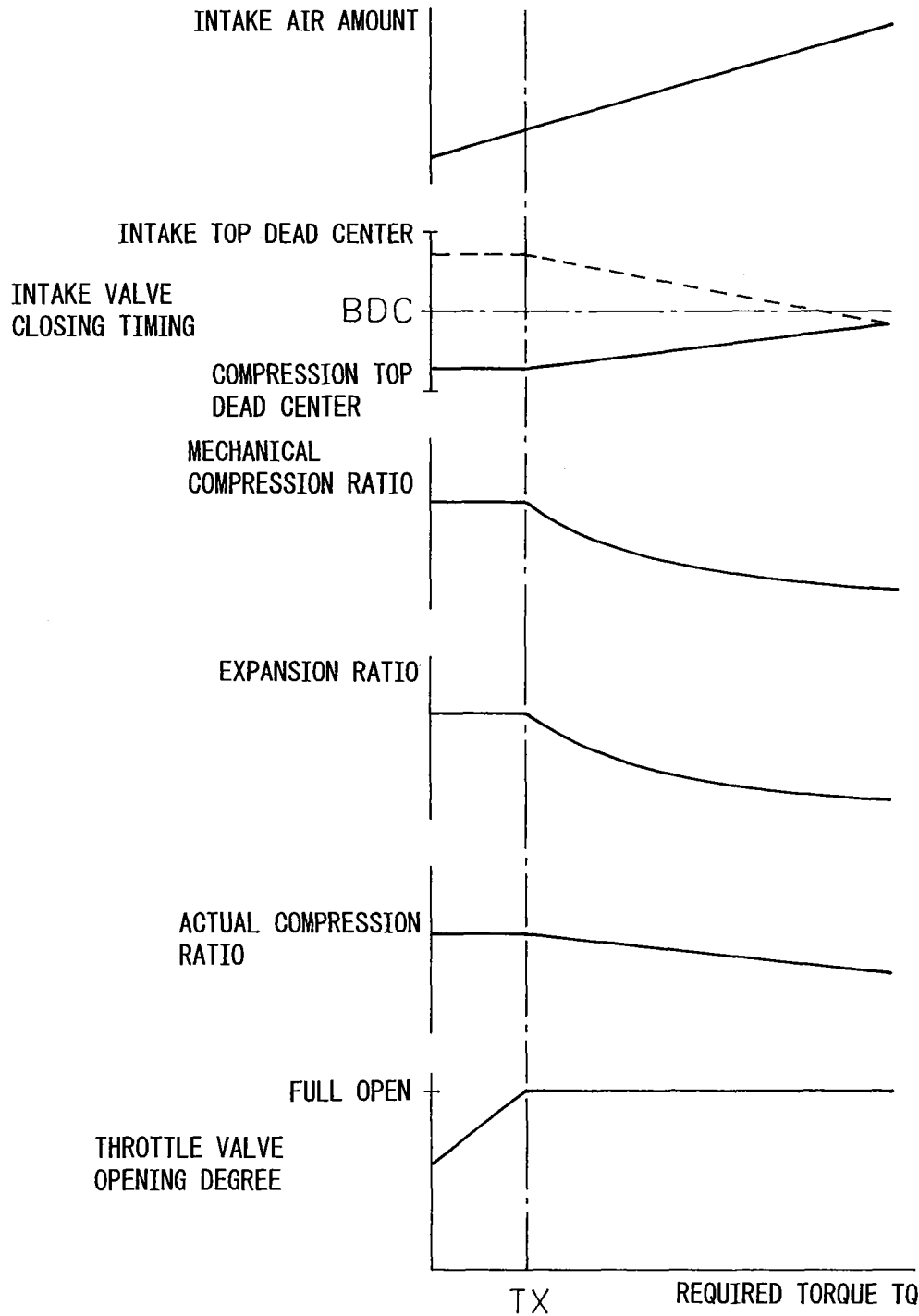
FIG. 9 is a view which shows the change in mechanical compression ratio etc. in accordance with the required torque.

Next, referring to FIG. 9, the overall operational control after completion of engine warmup will be briefly explained.

FIG. 9 shows the changes in the amount of intake air, the closing timing of the intake valve, the mechanical compression ratio, the expansion ratio, the actual compression ratio, and the opening degree of the throttle valve 17 in accordance with the required torque of the engine when the engine speed is a certain speed after completion of engine warmup. Note that FIG. 9 shows the case where the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_X$ in the exhaust gas.

Now, as explained above, at the time of engine high load operation, that is, when the required torque TQ is high, the ordinary cycle shown in FIG. 8(A) is executed. Therefore, as shown in FIG. 9, at this time, since the mechanical compression ratio is made low, the expansion ratio becomes low. As shown by the solid line in FIG. 9, the closing timing of the intake valve 7 is advanced as shown by the solid line in FIG. 5. Further, at this time, the amount of intake air is large. At this time, the opening degree of the throttle valve 17 is maintained full open.

On the other hand, as shown by the solid line in FIG. 9, if the required torque TQ of the engine becomes low, along with this the closing timing of the intake valve 7 is retarded to reduce the amount of intake air. Further, at this time, the mechanical compression ratio is increased as the required torque TQ of the engine becomes lower so that the actual compression ratio increases bit by bit as the required torque TQ of the engine becomes lower. Therefore, at this time, the expansion ratio is also increased as the required torque TQ of the engine becomes lower. Note that at this time as well, the throttle valve 17 is held at the full open state. Therefore the amount of intake air fed to the combustion chamber 5 is controlled not by the throttle valve 17, but by changing the closing timing of the intake valve 7.

If the required torque TQ of the engine becomes further lower, the mechanical compression ratio is made to further increase. If the required torque TQ of the engine falls to the torque TX on the low load side, the mechanical compression ratio is made the maximum mechanical compression ratio. In the region of a required torque TQ lower than the torque TX when the mechanical compression ratio is made the maximum mechanical compression ratio, the mechanical compression ratio is held at the maximum mechanical compression ratio. Therefore, at the time of engine low load operation, the mechanical compression ratio becomes maximum and the expansion ratio also becomes maximum.

On the other hand, in the embodiment which is shown in FIG. 9, if the required torque TQ of the engine falls down to TX, the closing timing of the intake valve 7 becomes the limit closing timing at which the amount of intake air which is supplied to the combustion chamber 5 can be controlled. If the closing timing of the intake valve 7 reaches the limit closing timing, in the region of a lower required torque TQ of the engine than the torque TX when the closing timing of the intake valve 7 reaches the limit closing timing, the closing timing of the intake valve 7 is held at the limit closing timing.

If the closing timing of the intake valve 7 is held at the limit closing timing, change of the closing timing of the intake valve 7 can no longer be used to control the amount of intake air. In the embodiment which is shown in FIG. 9, that is, in the region of a lower required torque TQ of the engine than the torque TX when the closing timing of the intake valve 7 reaches the limit closing timing, the throttle valve 17 is used to control the amount of intake air which is supplied to the inside of the combustion chamber 5. The opening degree of the throttle valve 17 is made smaller the lower the required torque TQ of the engine.

On the other hand, as shown by the broken line in FIG. 9, it is possible to control the amount of intake air without relying on the throttle valve 17 if just advancing the closing timing of the intake valve 7 as the required torque TQ of the engine becomes lower. Therefore, if expressing this to cover both the case which is shown by the solid line in FIG. 9 and the case which is shown by the broken line, in this embodiment according to the present invention, as the required torque TQ of the engine becomes lower, the closing timing of the intake valve 7 is made to move in a direction away from intake bottom dead center BDC up to the limit closing timing TX at which the amount of intake air which is supplied to the inside of the combustion chamber can be controlled.

In this regard, as explained above, in the superhigh expansion ratio cycle which is shown in FIG. 8(B), the expansion ratio is made 26. The higher this expansion ratio, the better, but as will be understood from FIG. 7, even if 20 or more with respect to the practically usable lower limit actual compression ratio $\epsilon=5$, a considerably high theoretical thermal efficiency can be obtained. Therefore, in this embodiment according to the present invention, the variable compression ratio mechanism A is formed so that the expansion ratio becomes 20 or more.

Figure 10:
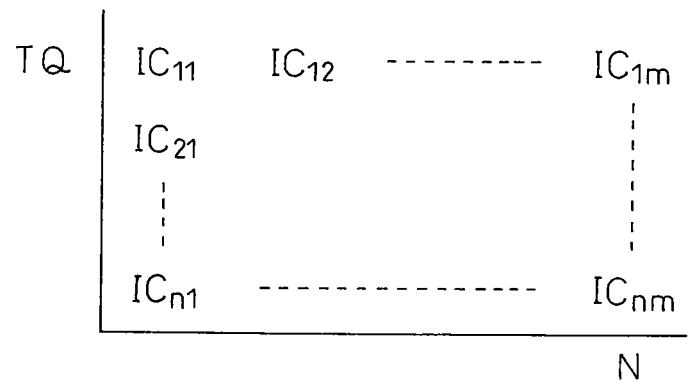
FIG. 10 is a view which shows a map of a target closing timing IC of an intake valve etc.
Figure 10:
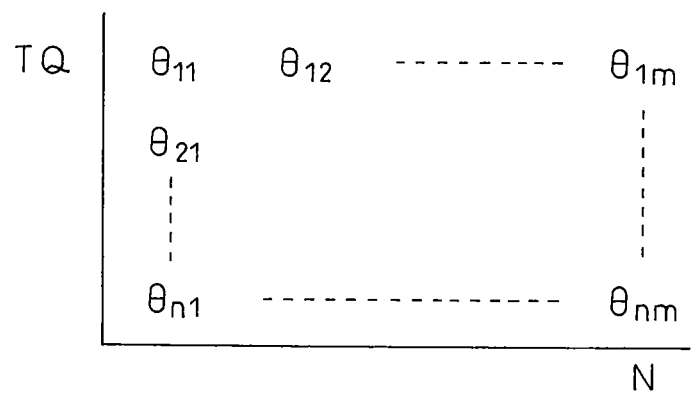

As explained above, in this embodiment according to the present invention, the amount of intake air which is supplied to the combustion chamber 5 is basically controlled by controlling the closing timing of the intake valve 7. The amount of intake air is controlled by the throttle valve 17 only at the time of low load operation. In this case, in this embodiment according to the present invention, the target closing timing IC of the intake valve 7 which is required for obtaining an amount of intake air which satisfies the required torque TQ is stored as a function of the requested torque TQ of the engine and the engine speed N in the form of a map such as shown in FIG. 10(A) in advance in the ROM 32. Further, the target opening degree θ of the throttle valve 17 is also stored as a function of the requested torque TQ of the engine and the engine speed N in the form of a map such as shown in FIG. 10(B) in advance in the ROM 32.

Figure 11:
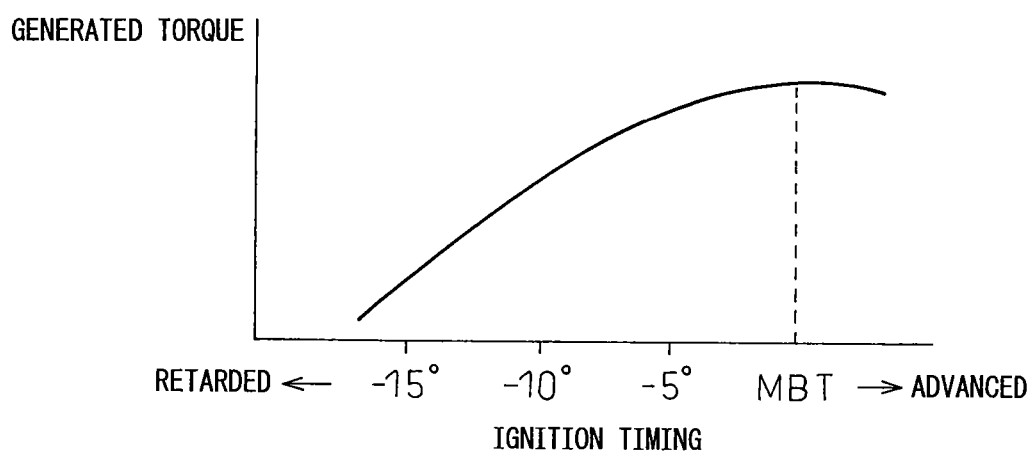
FIG. 11 is a view which shows a relationship between a torque generated by an engine and an ignition timing.
Figure 11:
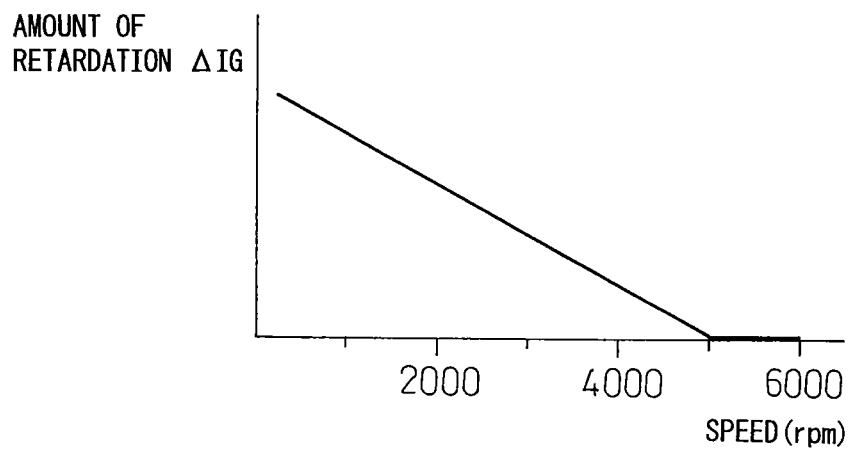

On the other hand, FIG. 11(A) shows the relationship between the torque which is generated by the engine and the ignition timing when the required torque TQ of the engine is a certain required torque. Note that, in FIG. 11(A), the abscissa indicates the crank angle based on the MBT (minimum advance for best torque). That is, in FIG. 11(A), the −15° of the abscissa shows that the amount of retardation of the ignition timing with respect to the MBT is 15°. On the other hand, FIG. 11(B) shows the relationship between the amount of retardation ΔIG of the ignition timing with respect to the MBT and the engine speed.

As will be understood from FIG. 11(A), when the ignition timing is made MBT, the maximum generated torque is obtained. Therefore, the ignition timing is preferably made the MBT. However, at the time of engine low speed operation, the disturbance occurring inside of the combustion chamber 5 is small, so the speed of propagation of the ignition flame is slow. If, at this time, making the ignition timing MBT, the unburned gas near the combustion chamber 5 will self ignite along with the rise in pressure of the combustion chamber 5 resulting in knocking. Therefore, at the time of engine low speed operation, the ignition timing cannot be made MBT. To prevent the occurrence of knocking at this time, the ignition timing has to be made to be retarded from MBT.

As opposed to this, at the time of engine high speed operation, powerful disturbance occurs inside the combustion chamber 5, so even if making the ignition timing MBT, knocking does not occur. Therefore, at the time of engine speed operation, the ignition timing is made MBT. Therefore, as shown in FIG. 11(B), the amount of retardation ΔIG of the ignition timing is made to increase over MBT as the engine speed becomes lower. Note that, as will be understood from FIG. 11(A), if the amount of retardation ΔIG with respect to MBT is made to increase, the torque generated by the engine falls.

Figure 12:
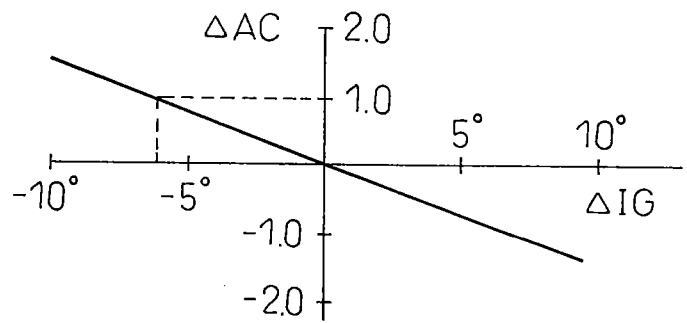
FIG. 12 is a view which explains a relationship between an amount of change $\Delta AC$ of the actual compression ratio and an amount of change $\Delta IG$ of the ignition timing and the thermal efficiency.
Figure 12:
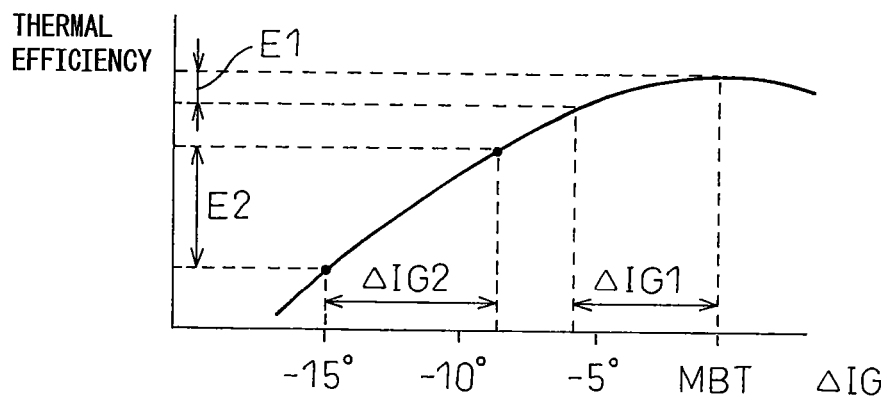
Figure 12:
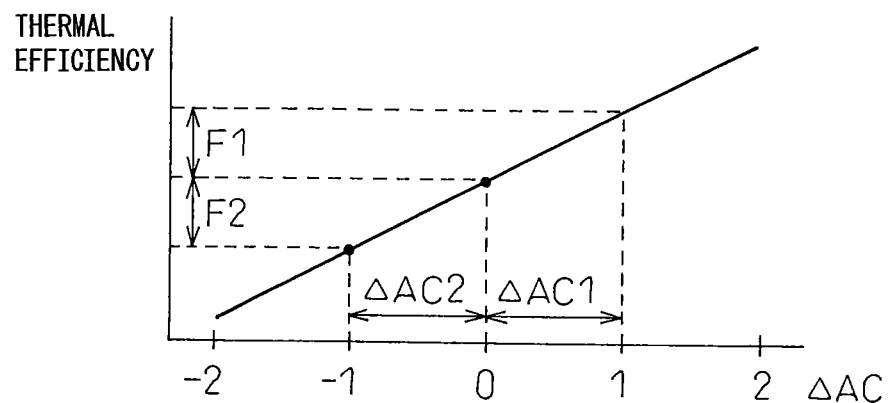

In this regard, if raising the actual compression ratio, knocking more easily occurs, and if advancing the ignition timing, knocking more easily occurs. Therefore, if causing the ignition timing to be retarded when raising the actual compression ratio, it is possible to prevent the occurrence of knocking, while conversely when advancing the ignition timing, if making the actual compression ratio lower, knocking can be prevented. FIG. 12(A) shows the relationship between the amount of change ΔAC of the actual compression ratio and the amount of change ΔIG of the ignition timing which is able to prevent the occurrence of knocking.

From FIG. 12(A), it will be understood that if making the amount of retardation ΔIG of the ignition timing larger as the amount of increase ΔAC of the actual compression ratio becomes larger, knocking can be prevented, and if making the amount of decrease ΔAC of the actual compression ratio larger as the amount of advance ΔIG of the ignition timing becomes larger, knocking can be prevented. Note that, FIG. 12(A) shows the relationship between ΔAC and ΔIG in the internal combustion engine which is shown in FIG. 1. In the internal combustion engine which is shown in FIG. 1, there is the relationship of ΔAC:ΔIG=1:6.

On the other hand, FIG. 12(B) shows the relationship between the thermal efficiency and the amount of change ΔIG of the ignition timing in the internal combustion engine which is shown in FIG. 1, while FIG. 12(C) shows the amount of change ΔAC of the thermal efficiency and the actual compression ratio in the internal combustion engine which is shown in FIG. 1. As will be understood from FIG. 12(B), if the amount of retardation ΔIG of the ignition timing increases with respect to the MBT, the amount of decrease gradually becomes larger. As opposed to this, as will be understood from FIG. 12(C), if the actual compression ratio increases, the thermal efficiency steadily increases.

On the other hand, FIGS. 12(B) and (C) show the changes in the thermal efficiency which making the actual compression ratio and the ignition timing change in accordance with the relationship of ΔAC1:ΔIG1=1:6 in the case where the ignition timing is MBT and the changes in the thermal efficiency when making the ignition timing and the actual compression ratio change in accordance with the relationship of ΔAC2:ΔIG2=1:6 when the ignition timing is retarded by 15° with respect to the MBT.

As explained above, at the time of engine high speed operation, the ignition timing is made MBT. As will be understood from FIG. 12(B), near MBT, even if the ignition timing changes somewhat, the thermal efficiency will not change that much. Therefore, compared with the amount of decrease E1 of the thermal efficiency when retarding the ignition timing with respect to the MBT by exactly ΔIG1, the amount of increase F1 of the thermal efficiency when increasing the actual compression ratio by exactly ΔAC1 becomes larger. Therefore, at the time of engine high speed operation, by making the actual compression ratio increase and by making the ignition timing retarded, it is possible to prevent the occurrence of knocking and to improve the thermal efficiency.

In this case, there are an actual compression ratio and ignition timing at which a difference (F1−E1) between the amount of increase F1 of the thermal efficiency due to an increase in the actual compression ratio and the amount of decrease E1 of the thermal efficiency due to retarding the ignition timing becomes maximum, and an actual compression ratio and an ignition timing at which the above difference (F1−E1) becomes maximum in the predetermined standard state after completion of engine warmup, that is, an actual compression ratio and an ignition timing which give the maximum thermal efficiency, are made the reference actual compression ratio and the reference ignition timing at the time of engine high speed operation. Note that, the "predetermined standard state" means for example an atmospheric pressure of the standard atmospheric pressure (0.1 MPa) and the atmospheric temperature, that is, an intake air temperature of 20° C.

On the other hand, as explained above, at the time of engine low speed operation, the ignition timing is greatly retarded with respect to MBT. At this time, as will be understood from FIG. 12(B), if the ignition timing changes, the thermal efficiency will greatly change. Therefore, compared with the amount of decrease F2 of the thermal efficiency when making the actual compression ratio be reduced by exactly ΔAC2, the amount of increase E2 of the thermal efficiency when making the ignition timing be advanced by exactly ΔIG2 becomes larger. Therefore, at the time of engine low speed operation, by making the ignition timing advance and making the actual compression ratio fall, it is possible to prevent the occurrence of knocking while improving the thermal efficiency.

In this case as well, there are an ignition timing and an actual compression ratio at which a difference (E2−F2) between an amount of increase E2 in the thermal efficiency due to advancing the ignition timing and an amount of decrease F2 of the thermal efficiency due to a decrease in the actual compression ratio becomes the maximum, and an ignition timing and an actual compression ratio at which the above difference (E2−F2) becomes maximum in the predetermined standard state after completion of engine warmup, that is, an ignition timing and an actual compression ratio which give the maximum thermal efficiency, are made the reference ignition timing and reference actual compression ratio at the time of engine low speed operation.

Figure 13:
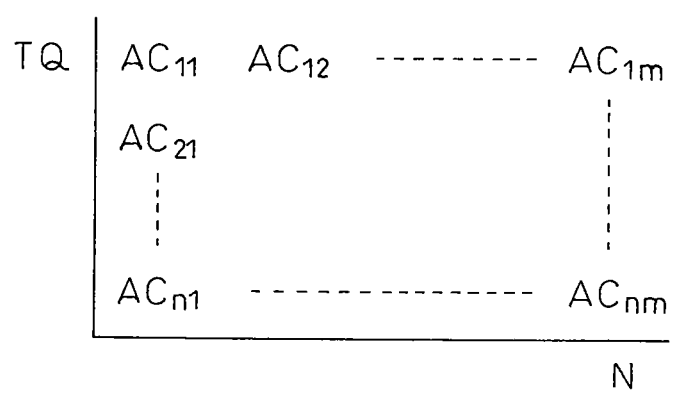
FIG. 13 is a view which shows a map of a reference actual compression ratio AC etc.
Figure 13:
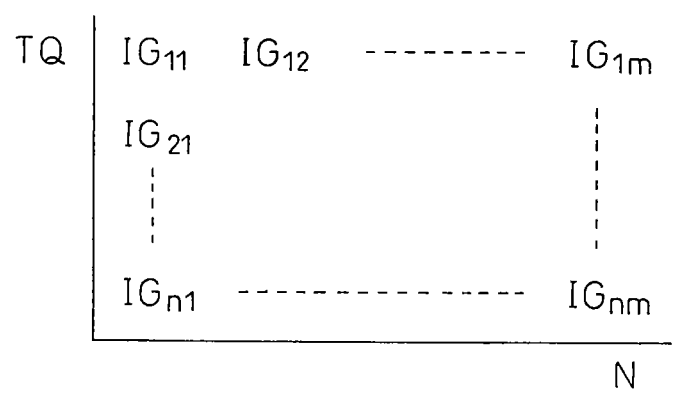

In this embodiment according to the present invention, these reference actual compression ratio AC and reference ignition timing IG in the predetermined standard state after completion of engine warm-up are stored as functions of the required torque TQ of the engine and the engine speed N in the form of maps such as in FIGS. 13(A) and (B) in advance in the ROM 32. After completion of engine warmup, these maps are used as the basis to calculate the actual compression ratio and the ignition timing.

Now then, when the engine temperature is low such as at the time of engine startup, knocking hardly ever occurs. Therefore, at this time, it is possible to raise the actual compression ratio or make the ignition timing advance so as to further improve the thermal efficiency. Further, when, like in the winter season, the intake air temperature is low, knocking hardly ever occurs. Therefore, at this time, it is possible to raise the actual compression ratio or advance the ignition timing so as to further improve the thermal efficiency.

In this case as well, the relationship between the thermal efficiency and the amount of retardation ΔIG of the ignition timing becomes the relationship such as shown in FIG. 12(B), while the relationship between the thermal efficiency and the amount of change ΔAC of the actual compression ratio becomes as shown in FIG. 12(C). That is, as explained above, at the time of engine high speed operation, the ignition timing is made near MBT. Near MBT, even if the ignition timing changes somewhat, the thermal efficiency will not change that much. Therefore, at the time of engine high speed operation, compared to advancing the ignition timing, increasing the actual compression ratio improves the thermal efficiency. Therefore, in the present invention, at the time of engine high speed operation when the engine temperature is low or when the intake air temperature is low, the actual compression ratio is made to increase over the reference actual compression ratio so as to raise the thermal efficiency.

On the other hand, at the time of engine low speed operation, as explained above, if causing the ignition timing to change, the thermal efficiency greatly changes. Therefore, at the time of engine low load operation, compared to making the actual compression ratio increase, causing the ignition timing to advance improves the thermal efficiency. Therefore, in the present invention, at the time of engine low speed operation when the engine temperature is low or when the intake air temperature is low, the ignition timing is made to advance from the reference ignition timing so as to raise the thermal efficiency.

That is, in the present invention, the actual compression ratio and the ignition timing in the predetermined standard state after completion of engine warmup are stored in advance as the reference actual compression ratio and the reference ignition timing in accordance with the different operating states of the engine. When the temperature representing the engine temperature is lower than the temperature in the standard state or when the intake air temperature is lower than the intake air temperature in the standard state, at the time of engine high speed operation, the actual compression ratio is made to increase over the reference actual compression ratio, while at the time of engine low speed operation, the ignition timing is made to advance from the reference ignition timing.

In this regard, when the engine temperature is low or when the intake air temperature is low in this way, if making the actual compression ratio increase or making the ignition timing advance so as to make the thermal efficiency rise, the exhaust gas temperature will end up falling. As a result, time will be required until the three-way catalyst, that is, the exhaust purification catalyst, becomes activated.

Therefore, in one embodiment according to the present invention, when the temperature which represents the engine temperature is lower than the temperature in the standard state or the intake air temperature is lower than the intake air temperature in the standard state and when the exhaust purification catalyst is activated, at the time of engine high speed operation, the actual compression ratio is made to increase over the reference actual compression ratio, while at the time of engine low speed operation, the ignition timing is made to advance over the reference ignition timing.

That is, in this embodiment, when the exhaust purification catalyst is not activated, the action of improvement of the thermal efficiency by the increase of the actual compression ratio or advance of the ignition timing is stopped, while when the exhaust purification catalyst is activated, the action of improvement of the thermal efficiency by the increase of the actual compression ratio or advance of the ignition timing is performed.

Note that, when the exhaust purification catalyst is not activated, it is possible to make the thermal efficiency lower and make the exhaust gas temperature rise so as to activate the exhaust purification catalyst earlier. In this case, the lower the actual compression ratio, the more the thermal efficiency falls, while the more retarded the ignition timing, the more the thermal efficiency falls. Therefore, in this embodiment, when the temperature which represents the engine temperature is lower than the temperature in the standard state or the intake air temperature is lower than the intake air temperature in the standard state and when the exhaust purification catalyst is not activated, the actual compression ratio is made to fall to the minimum actual compression ratio and the ignition timing is retarded by the maximum amount of retardation.

Now then, as explained above, in the present invention, when the engine temperature is low or when the intake air temperature is low, at the time of engine high speed operation, the actual compression ratio is increased, while at the time of engine low speed operation, the ignition timing is advanced. In this regard, at this time as well, in the same way as the case of the standard state after completion of engine warmup already explained, at the time of engine high speed operation, there are an actual compression ratio and an ignition timing at which the difference between the amount of increase of the thermal efficiency due to an increase of the actual compression ratio and the amount of decrease of the thermal efficiency due to retardation of the ignition timing becomes maximum, while at the time of engine low speed operation, there are an ignition timing and an actual compression ratio at which the difference between the amount of increase of the thermal efficiency due to advance of the ignition timing and the amount of decrease of the thermal efficiency due to lowering of the actual compression ratio becomes maximum.

Figure 14:
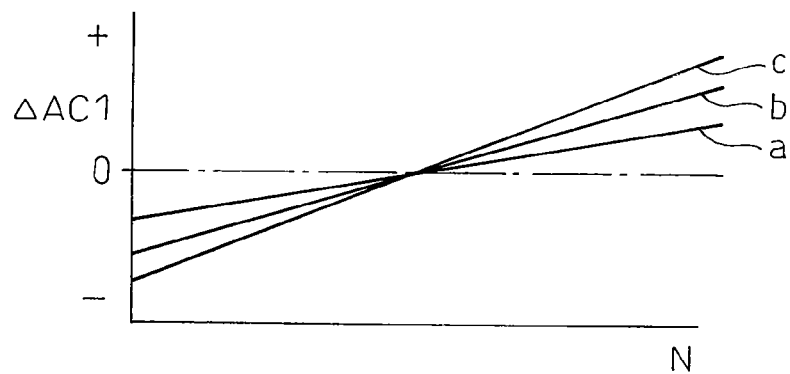
FIG. 14 is a view for explaining control of the actual compression ratio and the ignition timing.
Figure 14:
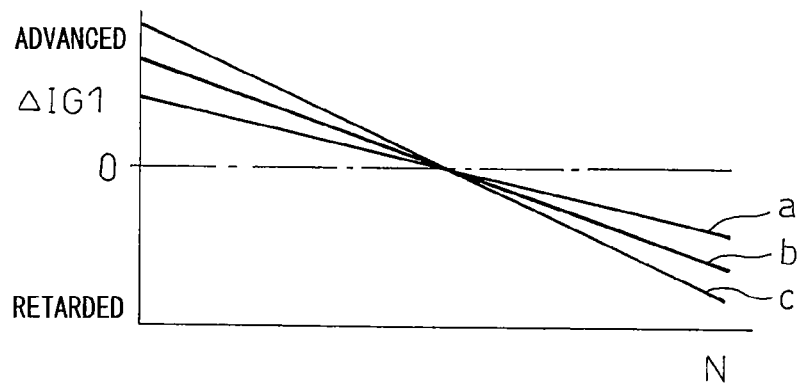

Therefore, in another embodiment according to the present invention, to further improve the thermal efficiency while preventing knocking, as shown in FIG. 14(A), at the time of engine high speed operation, the actual compression ratio is made to increase and the ignition timing is retarded, while at the time of engine low speed operation, the ignition timing is made to advance and the actual compression ratio is made to decrease.

FIG. 14(B) shows the relationship between the amount of increase or decrease ΔAC1 of the actual compression ratio for different intake air temperatures "a", "b", and "c" and the engine speed N in another embodiment, while FIG. 14(C) shows the relationship between the amount of advance or the amount of retardation ΔIG1 of the ignition timing for different intake air temperatures "a", "b", and "c" and the engine speed N in another embodiment. Note that, in FIGS. 14(B) and (C), the intake air temperatures are in the relationship of a>b>c. Therefore, from FIGS. 14(B) and (C), it will be understood that the higher the engine speed N and the lower the intake air temperature, the more the amount of increase ΔAC1 of the actual compression ratio is made to increase and the more the amount of retardation ΔIG1 of the ignition timing is made to increase, while the lower the engine speed N and the lower the intake air temperature, the more the amount of decrease ΔAC1 of the actual compression ratio is made to increase and the more the amount of advance ΔIG1 of the ignition timing is made to increase.

Figure 15:
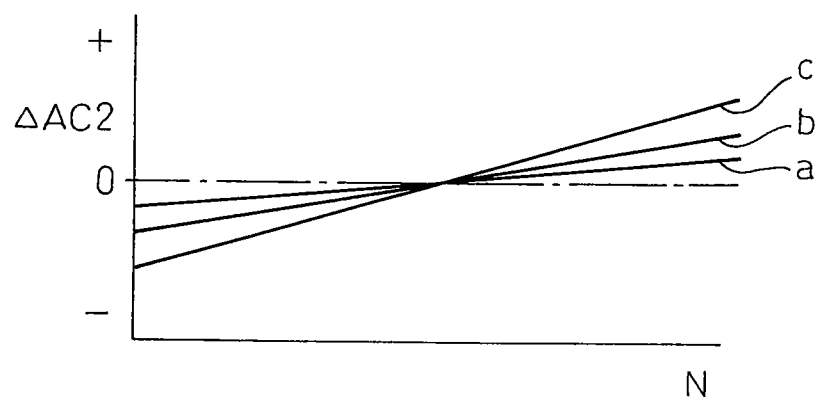
FIG. 15 is a view for explaining control of the actual compression ratio and the ignition timing.
Figure 15:
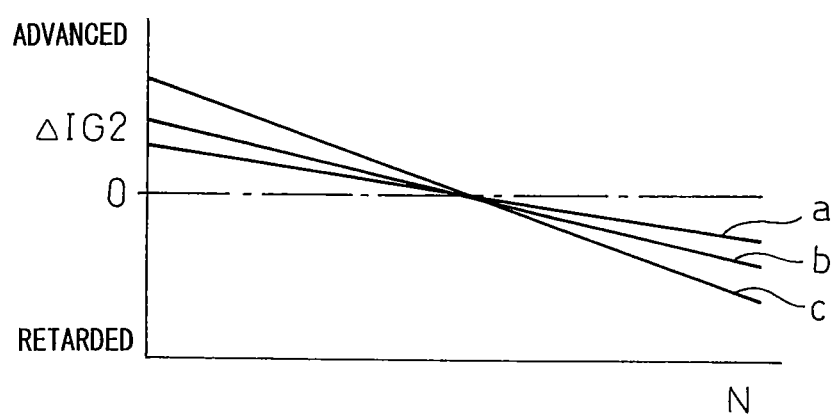

Further, FIGS. 15(A) and (B) show the relationships in the case where the engine cooling water temperature is used as the temperature which represents the engine temperature in this other embodiment. That is, FIG. 15(A) shows the relationship between the amount of increase or amount of decrease ΔAC2 of the actual compression ratio and the engine speed N for different engine cooling water temperatures "a", "b", and "c", while FIG. 15(B) shows the relationship between the amount of advance or the amount of retardation ΔIG2 of the ignition timing and the engine speed N for different engine cooling water temperatures "a", "b", and "c". Note that, in FIGS. 15(A) and (B), the engine cooling water temperatures are in the relationship of a>b>c.

Therefore, from FIGS. 15(A) and (B), it will be understood that the higher the engine speed N and the lower the engine cooling water temperature, the more the amount of increase ΔAC2 of the actual compression ratio is made to increase and the more the amount of retardation ΔIG2 of the ignition timing is increased, while the lower the engine speed N and the lower the engine cooling water temperature, the more the amount of decrease ΔAC2 of the actual compression ratio is made to increase and the more the amount of advance ΔIG2 of the ignition timing is made to increase.

Figure 16:
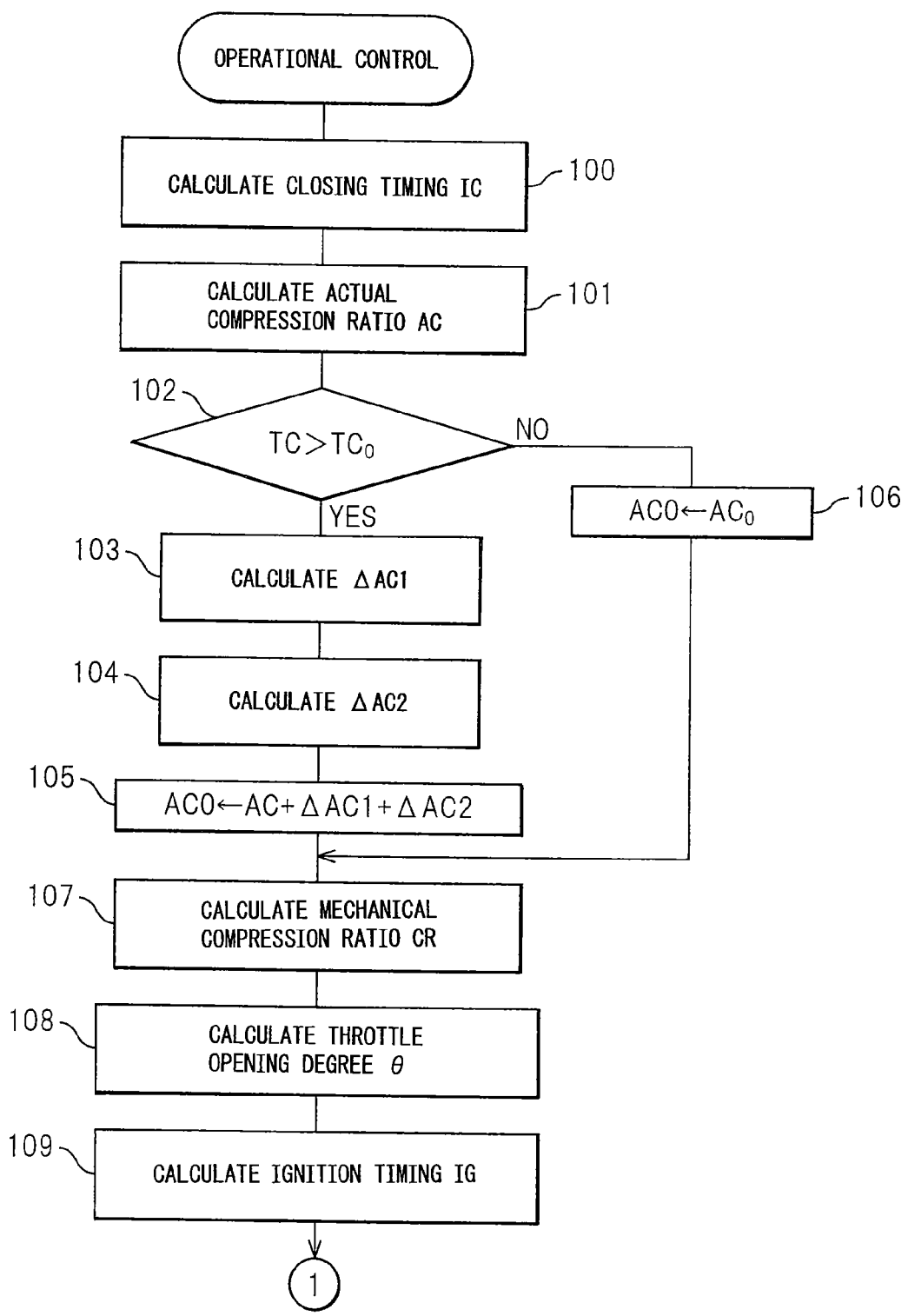
FIG. 16 is a flowchart for operational control.
Figure 17:
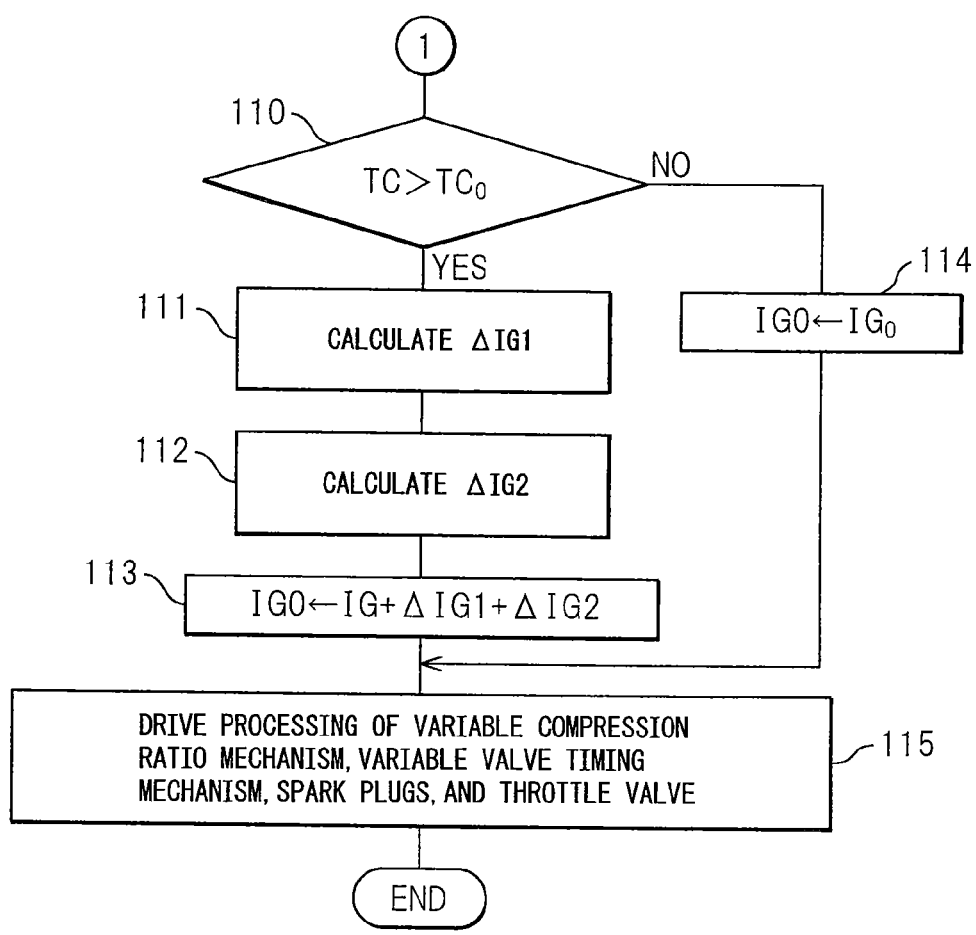
FIG. 17 is a flowchart for operational control.

An operational control routine of the other embodiment will be shown in FIG. 16 as a typical operational control routine. Note that, this routine is performed by interruption every certain time period.

Referring to FIG. 16, first, at step 100, the target closing timing IC of the intake valve 7 is calculated from the map which is shown in FIG. 10(A). Next, at step 101, the reference actual compression ratio AC in the standard state after the completion of engine warm-up is calculated from the map which is shown in FIG. 13(A). Next, at step 102, it is judged if the catalyst temperature TC which is detected by the temperature sensor 24 is higher than the catalyst activation temperature $TC_0$. When $TC \leq TC_0$, the routine proceeds to step 106 where the target actual compression ratio AC0 is made the minimum actual compression ratio $AC_0$. Next, the routine proceeds to step 107. As opposed to this, when $TC>TC_0$, the routine proceeds to step 103.

At step 103, the amount of increase or the amount of decrease ΔAC1 of the actual compression ratio is calculated based on the intake air temperature detected by the temperature sensor 23 and the engine speed N from the relationship which is shown in FIG. 14(B). Next, at step 104, the amount of increase or the amount of decrease ΔAC2 of the actual compression ratio is calculated based on the engine cooling water temperature detected by the temperature sensor 22 and the engine speed N from the relationship which is shown in FIG. 15(A). Next, at step 105, the reference actual compression ratio AC is increased by ΔAC1 and ΔAC2 to calculate the target actual compression ratio AC0 (=AC+ΔAC1+ΔAC2). Next, the routine proceeds to step 107.

At step 107, the target mechanical compression ratio CR which is required for making the actual compression ratio the target actual compression ratio AC0 is calculated. Next, at step 108, the target opening degree θ of the throttle valve 17 is calculated from the map which is shown in FIG. 10(B). Next, at step 109, the reference ignition timing IG in the standard state after completion of engine warm-up is calculated from the map which is shown in FIG. 13(B). Next, at step 110, it is again judged if the catalyst temperature TC which is detected by the temperature sensor 24 is higher than the catalyst activation temperature $TC_0$. When $TC \leq TC_0$, the routine proceeds to step 114 where the target ignition timing IG0 is made the maximum amount of retardation $IG_0$. Next, the routine proceeds to step 115. As opposed to this, when $TC>TC_0$, the routine proceeds to step 111.

At step 111, the amount of advance or the amount of retardation ΔIG1 of the ignition timing is calculated based on the intake air temperature detected by the temperature sensor 23 and the engine speed N from the relationship which is shown in FIG. 14(C). Next, at step 112, the amount of advance or the amount of retardation ΔIG2 of the ignition timing is calculated based on the engine cooling water temperature detected by the temperature sensor 22 and the engine speed N from the relationship which is shown in FIG. 15(B). Next, at step 113, the reference ignition timing IG is increased by ΔIG1 and ΔIG2 to calculate the target ignition timing IG0(=IG+ΔIG1+ΔIG2). Next, the routine proceeds to step 115. At step 115, the variable compression ratio mechanism A is controlled so that the mechanical compression ratio becomes the target mechanical compression ratio CR, the variable valve timing mechanism B is controlled so that the closing timing of the intake valve 7 becomes the target closing timing IC, the ignition action by the spark plug 6 is controlled so that the ignition timing becomes the target ignition timing IG0, and the throttle valve 17 is controlled so that the opening degree of the throttle valve 17 becomes the target opening degree θ.

REFERENCE SIGNS LIST

1 . . . crankcase
2 . . . cylinder block
3 . . . cylinder head
4 . . . piston
5 . . . combustion chamber
7 . . . intake valve
22, 23, 24 . . . temperature sensor
70 . . . cam shaft for driving intake valve
A . . . variable compression ratio mechanism
B . . . variable valve timing mechanism

The invention claimed is:

1. A spark ignition type internal combustion engine comprising a variable compression ratio mechanism able to change a mechanical compression ratio and a variable valve timing mechanism able to control a closing timing of an intake valve, wherein an actual compression ratio and ignition timing in a predetermined standard state after completion of engine warm-up are stored in advance as a reference actual compression ratio and a reference ignition timing in accordance with each operating state of the engine, when a temperature which represents an engine temperature is lower than a temperature in the standard state or when an intake air temperature is lower than an intake air temperature in the standard state, if at the time of engine high speed operation, the actual compression ratio is made to increase over the reference actual compression ratio so as to make a thermal efficiency rise, while if at the time of engine low speed operation, the ignition timing is made to advance over the reference ignition timing so as to make the thermal efficiency rise.

2. A spark ignition type internal combustion engine as claimed in claim 1, wherein when the temperature which represents the engine temperature is lower than the temperature in the standard state or the intake air temperature is lower than the intake air temperature in the standard state and when the exhaust purification catalyst is activated, if at the time of engine high speed operation, the actual compression ratio is made to increase over said reference actual compression ratio so as to make the thermal efficiency rise, while if at the time of engine low speed operation, the ignition timing is made to be advanced from said reference ignition timing so as to make the thermal efficiency rise.

3. A spark ignition type internal combustion engine as claimed in claim 2, wherein when the temperature which represents the engine temperature is lower than the temperature in the standard state or the intake air temperature is lower than the intake air temperature in the standard state and when the exhaust purification catalyst is not activated, the actual compression ratio is made to fall to a minimum actual compression ratio and the ignition timing is made to be retarded to a maximum amount of retardation.

4. A spark ignition type internal combustion engine as claimed in claim 1, wherein when the temperature which represents the engine temperature is lower than the temperature in the standard state or when the intake air temperature is lower than the intake air temperature in the standard state, at the time of engine high speed operation, the actual compression ratio is made to increase over said reference actual compression ratio and the ignition timing is made to be retarded from said reference ignition timing, while at the time of engine low speed operation, the ignition timing is made to be advanced from said reference ignition timing and the actual compression ratio is made to fall from said reference actual compression ratio.

5. A spark ignition type internal combustion engine as claimed in claim 4, wherein the lower the temperature which represents the engine temperature from the temperature in the standard state or the lower the intake air temperature from the intake air temperature in the standard state, the more the actual compression ratio is made to increase and the more the ignition timing is retarded at the time of engine high speed operation and the more the ignition timing is made to advance and the more the actual compression ratio is made to fall at the time of engine low speed operation.

6. A spark ignition type internal combustion engine as claimed in claim 1, wherein when the temperature which represents the engine temperature is lower than the temperature in the standard state or when the intake air temperature is lower than the intake air temperature in the standard state, at the time of engine high speed operation, the actual compression ratio is made to increase over said reference actual compression ratio and the ignition timing is made to be retarded from said reference ignition timing, while at the time of engine low speed operation, the ignition timing is made to be advanced from said reference ignition timing.

* * * * *